US008392565B2

(12) United States Patent
Tripathi et al.

(10) Patent No.: US 8,392,565 B2
(45) Date of Patent: Mar. 5, 2013

(54) NETWORK MEMORY POOLS FOR PACKET DESTINATIONS AND VIRTUAL MACHINES

(75) Inventors: Sunay Tripathi, San Jose, CA (US); Erik Nordmark, Mountain View, CA (US); Nicolas G. Droux, Rio Rancho, NM (US)

(73) Assignee: Oracle America, Inc., Redwood Shores, CA (US)

( * ) Notice: Subject to any disclaimer, the term of this patent is extended or adjusted under 35 U.S.C. 154(b) by 1936 days.

(21) Appl. No.: 11/490,486

(22) Filed: Jul. 20, 2006

(65) Prior Publication Data

US 2008/0022016 A1 Jan. 24, 2008

(51) Int. Cl.
*G06F 15/173* (2006.01)
(52) U.S. Cl. .................................. 709/226; 709/223
(58) Field of Classification Search .............. 709/226, 709/223
See application file for complete search history.

(56) References Cited

U.S. PATENT DOCUMENTS

| | | | | |
|---|---|---|---|---|
| 4,916,608 A * | 4/1990 | Shultz | ............................ | 718/104 |
| 4,953,157 A * | 8/1990 | Franklin et al. | ................ | 370/230 |
| 5,600,820 A * | 2/1997 | Johnston | ........................ | 711/171 |
| 6,041,053 A | 3/2000 | Douceur et al. | | |
| 6,070,219 A | 5/2000 | McAlpine et al. | | |
| 6,157,955 A * | 12/2000 | Narad et al. | ..................... | 709/228 |
| 6,163,539 A | 12/2000 | Alexander et al. | | |
| 6,477,643 B1 | 11/2002 | Vorbach et al. | | |
| 6,600,721 B2 | 7/2003 | Edholm | | |
| 6,625,709 B2 * | 9/2003 | Aiken et al. | ................... | 711/170 |
| 6,714,960 B1 | 3/2004 | Bitar et al. | | |
| 6,757,731 B1 | 6/2004 | Barnes et al. | | |
| 6,831,893 B1 | 12/2004 | Ben Nun et al. | | |
| 6,859,841 B2 | 2/2005 | Narad et al. | | |
| 6,944,168 B2 | 9/2005 | Paatela et al. | | |
| 6,999,998 B2 * | 2/2006 | Russell | ......................... | 709/213 |
| 7,046,665 B1 | 5/2006 | Walrand et al. | | |
| 7,177,311 B1 | 2/2007 | Hussain et al. | | |
| 7,260,102 B2 | 8/2007 | Mehrvar et al. | | |
| 7,260,631 B1 * | 8/2007 | Johnson et al. | ............... | 709/224 |
| 7,313,142 B2 | 12/2007 | Matsuo et al. | | |
| 7,327,749 B1 * | 2/2008 | Mott et al. | .................... | 370/413 |
| 7,752,417 B2 * | 7/2010 | Manczak et al. | .............. | 711/209 |
| 7,889,734 B1 * | 2/2011 | Hendel et al. | ................. | 370/392 |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, 11 pages.

(Continued)

*Primary Examiner* — Ashok Patel
*Assistant Examiner* — Lawrence Cosby
(74) *Attorney, Agent, or Firm* — Osha Liang LLP

(57) ABSTRACT

A method for processing a packet that includes receiving a packet for a target, classifying the packet, and sending the packet to a receive ring based on the classification. The method also includes obtaining an identifier (ID) associated with the target based on the classification, and sending a request for virtual memory that includes the ID. Furthermore, the method includes determining, using the ID, whether the target has exceeded a virtual memory allocation associated with the target. In addition, the method includes allocating the virtual memory, storing the packet in the virtual memory, and updating the virtual memory allocation associated with the target to reflect the allocation of the virtual memory, all if the target does not exceed the virtual memory allocation. The method further includes waiting until the target is not exceeding the virtual memory allocation if the target exceeds the virtual memory allocation.

20 Claims, 5 Drawing Sheets

U.S. PATENT DOCUMENTS

| | | |
|---|---|---|
| 2003/0037154 A1 | 2/2003 | Poggio et al. |
| 2003/0065676 A1* | 4/2003 | Gbadegesin et al. ...... 707/104.1 |
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2006/0036705 A1* | 2/2006 | Musoll et al. ................ 709/210 |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0174324 A1 | 8/2006 | Zur et al. |
| 2007/0283115 A1* | 12/2007 | Freeman et al. .............. 711/163 |

OTHER PUBLICATIONS

"Solaris Networking—The Magic Revealed (Part I)"; Sunay Tripathi's Solaris Networking Weblog; Nov. 14, 2005, pp. 1-22 (22 pages).

* cited by examiner

NETWORK MEMORY POOLS FOR PACKET DESTINATIONS AND VIRTUAL MACHINES

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. Pat. No. 7,471,689; "Method and Apparatus for Consolidating Available Computing Resources on Different Computing Devices" with U.S. Pat. No. 7,782,870; "Assigning Higher Priority to Transactions Based on Subscription Level" with U.S. Pat. No. 7,591,011; "Method and Apparatus for Dynamically Isolating Affected Services Under Denial of Service Attack" with U.S. Pat. No. 7,739,736; "Method and Apparatus for Improving User Experience for Legitimate Traffic of a Service Impacted by Denial of Service Attack" with U.S. Pat. No. 7,627,899; "Method and Apparatus for Limiting Denial of Service Attack by Limiting Traffic for Hosts" with U.S. Pat. No. 7,640,591; "Hardware-Based Network Interface Per-Ring Resource Accounting" with U.S. Pat. No. 7,623,538; "Dynamic Hardware Classification Engine Updating for a Network Interface" with U.S. Pat. No. 7,593,404; "Network Interface Card Resource Mapping to Virtual Network Interface Cards" with U.S. Pat. No. 7,733,890; "Network Interface Decryption and Classification Technique" with U.S. Pat. No. 7,607,168; "Method and Apparatus for Enforcing Resource Utilization of a Container" with U.S. Pat. No. 7,697,434; "Method and Apparatus for Enforcing Packet Destination Specific Priority Using Threads" with U.S. Pat. No. 7,499,457; "Method and Apparatus for Processing Network Traffic Associated with Specific Protocols" with U.S. Pat. No. 7,675,920.

The present application contains subject matter that may be related to the subject matter in the following U.S. applications filed on Oct. 21, 2005, and assigned to the assignee of the present application: "Method and Apparatus for Defending Against Denial of Service Attacks" with U.S. Pat. No. 11/255,366; "Router Based Defense Against Denial of Service Attacks Using Dynamic Feedback from Attacked Host" with U.S. Pat. No. 7,760,722; and "Method and Apparatus for Monitoring Packets at High Data Rates" with U.S. Pat. No. 7,746,783.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. Pat. No. 7,672,299; "Method and System for Controlling Virtual Machine Bandwidth" with U.S. Pat. No. 7,613,132; "Virtual Switch" with U.S. Pat. No. 7,643,482; "System and Method for Virtual Network Interface Cards Based on Internet Protocol Addresses" with U.S. Pat. No. 7,684,423; "Virtual Network Interface Card Loopback Fastpath" with U.S. Pat. No. 7,630,368; "Bridging Network Components" with U.S. Pat. No. 7,634,608; "Reflecting the Bandwidth Assigned to a Virtual Network Interface Card Through Its Link Speed" with U.S. Pat. No. 7,792,140; "Method and Apparatus for Containing a Denial of Service Attack Using Hardware Resources on a Virtual Network Interface Card" with U.S. Pat.No. 7,966,401; "Virtual Network Interface Cards with VLAN Functionality" with U.S. Pat. No. 7,742,474; "Method and Apparatus for Dynamic Assignment of Network Interface Card Resources" with U.S. Pat. No. 7,613,198; "Generalized Serialization Queue Framework for Protocol Processing" with U.S. Pat. No. 7,715,416; "Serialization Queue Framework for Transmitting Packets" with U.S. Pat. No. 8,149,709.

The present application contains subject matter that may be related to the subject matter in the following U.S. applications filed on Jul. 20, 2006, and assigned to the assignee of the present application: "Low Impact Network Debugging" with U.S. Pat. No. 8,050,266; "Reflecting Bandwidth and Priority in Network Attached Storage I/O" with U.S. Pat. No. 7,836,212; "Priority and Bandwidth Specification at Mount Time of NAS Device Volume" with U.S. Pat. No. 8,095,675; "Notifying Network Applications of Receive Overflow Conditions" with U.S. Pat. No. 8,036,127; "Host Operating System Bypass for Packets Destined for a Virtual Machine" with U.S. Pat. No. 8,005,022; "Multi-Level Packet Classification" with U.S. Pat. No. 7,848,331; "Method and System for Automatically Reflecting Hardware Resource Allocation Modifications" with U.S. Pat. No. 7,778,411; "Multiple Virtual Network Stack Instances Using Virtual Network Interface Cards" with U.S. Pat. No. 7,885,257; "Method and System for Network Configuration for Containers" with U.S. Pat. No. 7,912,926; "Method and System for Network Configuration for Virtual Machines" with U.S. Application Ser. No. 11/489,923; "Multiple Virtual Network Stack Instances" with U.S. Pat. No. 7,894,453; and "Shared and Separate Network Stack Instances" with U.S. Application Ser. No. 11/489,933.

BACKGROUND

Network traffic is transmitted over a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for processing a packet that includes receiving a packet for a first target on a host, classifying the packet, and sending the packet to a receive ring based on the classification. The method also includes obtaining an identifier (ID) based on the classification, wherein the ID is associated with the first target, and sending a request for virtual memory on the host, wherein the request includes the ID. Furthermore, the method includes determining, using the ID, whether the first target has exceeded a virtual memory allocation associated with the first target. In addition, the method includes allocating the virtual memory, storing the packet in the virtual memory on the host, and updating the virtual memory allocation associated with the first target to reflect the allocation of the virtual memory, all if the first target does not exceed the virtual memory allocation. The method further includes waiting until the first target is not exceeding the virtual memory allocation if the first target exceeds the virtual memory allocation.

In general, on one aspect, the invention relates to a system that includes a network interface card (NIC) and a host operatively connected to the NIC. The NIC is configured to: receive a packet for a first target on a host; classify the packet; send the packet to a receive ring based on the classification; obtain an ID based on the classification, wherein the ID is associated with the first target; and send a request for virtual memory on the host, wherein the request comprises the ID. The host is configured to determine, using the ID, whether the first target has exceeded a virtual memory allocation associated with the first target. The host is further configured to: allocate the virtual memory; obtain the packet from the receive ring; store the packet in the virtual memory on the host; and update the virtual memory allocation associated with the first target to reflect the allocation of the virtual memory, all if the first target does not exceed the virtual memory allocation. In addition, the host is configured to wait until the first target is not exceeding the virtual memory allocation if the first target exceeds the virtual memory allocation.

In general, in one aspect, the invention relates to a computer readable medium including instructions for a method for processing a packet. The method includes receiving a packet for a first target on a host, classifying the packet, and sending the packet to a receive ring based on the classification. The method also includes obtaining an identifier (ID) based on the classification, wherein the ID is associated with the first target, and sending a request for virtual memory on the host, wherein the request comprises the ID. Furthermore, the method includes determining, using the ID, whether the first target has exceeded a virtual memory allocation associated with the first target. In addition, the method includes allocating the virtual memory, storing the packet in the virtual memory on the host, and updating the virtual memory allocation associated with the first target to reflect the allocation of the virtual memory, all if the first target does not exceed the virtual memory allocation. The method further includes waiting until the first target is not exceeding the virtual memory allocation if the first target exceeds the virtual memory allocation.

Other aspects of the invention will be apparent from the following description and the appended claims.

DETAILED DESCRIPTION

Figure 1:
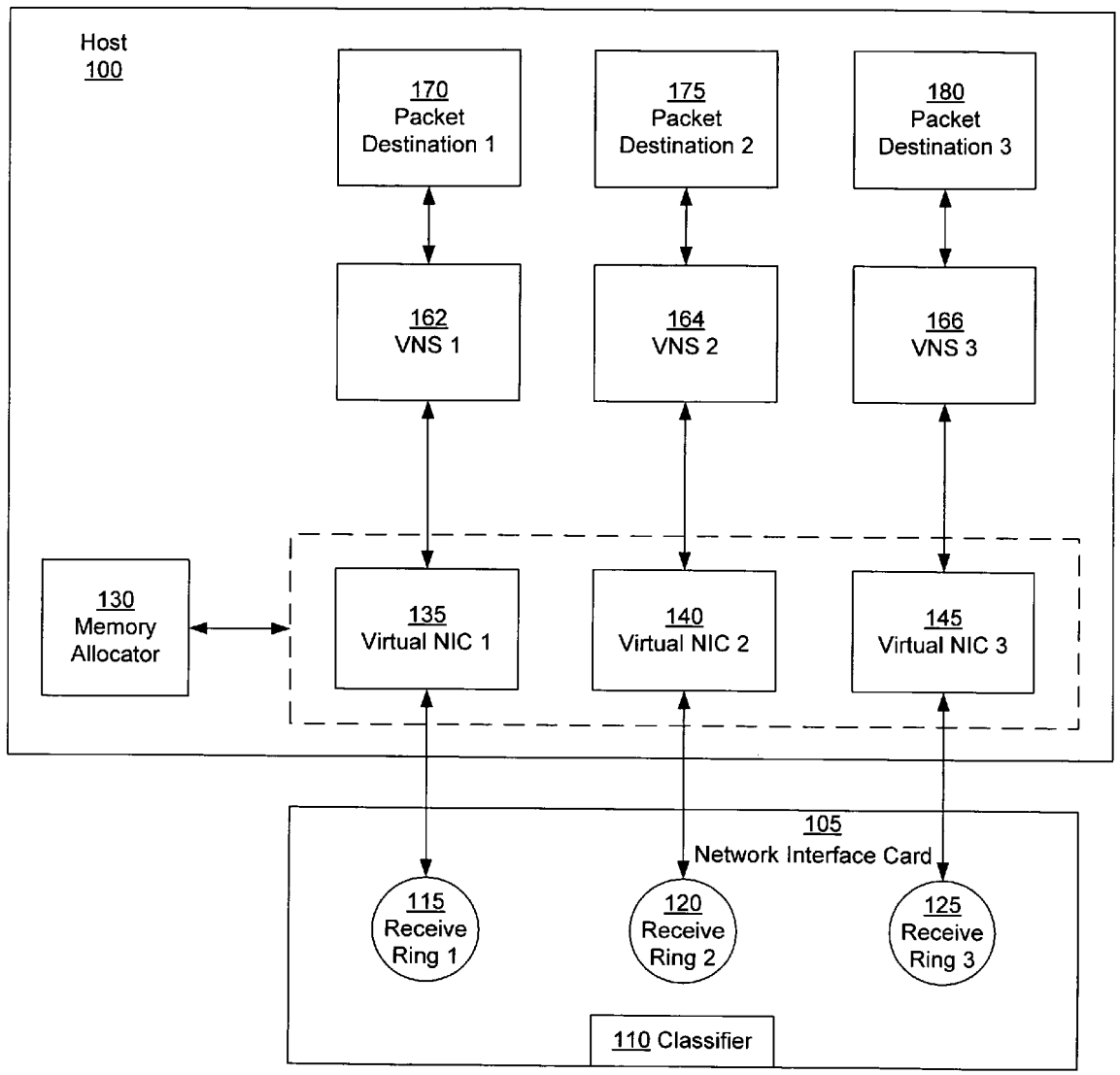
FIGS. 1-2 shows schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to allocate virtual memory for network packets. Packets received by a network interface card (NIC) are classified and placed in receive rings in the NIC before entering the host. Because packets are first classified, a virtual memory limit may be enforced such that incoming packets are allowed into the host only when enough virtual memory is present to store them. In addition, outgoing packets are transmitted only when enough virtual memory is available to process the packets and send the packets to transmit rings on the NIC.

In one or more embodiments of the invention, virtual memory is allocated based on the priority of packet destinations or virtual machines associated with the packets. In addition, shortages in virtual memory may be handled by transferring virtual memory from lower priority packet destinations or virtual machines to higher priority packet destinations or virtual machines.

FIG. 1 shows a schematic diagram of a system in accordance with one or more embodiments of the invention. As shown in FIG. 1, the system includes a host (100), a network interface card (NIC) (105), multiple virtual NICs (e.g., virtual NIC 1 (135), virtual NIC 2 (140), virtual NIC 3 (145)), a memory allocator (130), multiple virtual network stacks (VNSs) (e.g., VNS 1 (162), VNS 2 (164), VNS 3 (166)), and multiple packet destinations (e.g., packet destination 1 (170), packet destination 2 (175), packet destination 3 (180)). Each of these components is described below.

The NIC (105) provides an interface between the host (100) and a network (not shown) (e.g., a local area network, a wide area network, a wireless network, etc.). More specifically, the NIC (105) includes a network interface (NI) (i.e., the hardware on the NIC used to interface with the network). For example, the NI may correspond to an RJ-45 connector, a wireless antenna, etc. The packets received by the NI are then forwarded to other components on the NIC (105) for processing. In one embodiment of the invention, the NIC (105) includes one or more receive rings (e.g., receive ring 1 (115), receive ring 2 (120), receive ring 3 (125)). In one embodiment of the invention, the receive rings (e.g., receive ring 1 (115), receive ring 2 (120), receive ring 3 (125)) correspond to portions of memory within the NIC (105) used to temporarily store packets received from the network. Further, in one embodiment of the invention, a ring element of the receive rings (e.g., receive ring 1 (115), receive ring 2 (120), receive ring 3 (125)) may point to host memory. In one embodiment of the invention, the classifier (110) is configured to analyze the incoming network traffic, typically in the form of packets, received from the network (not shown).

In one embodiment of the invention, analyzing individual packets includes determining to which of the receive rings (e.g., receive ring 1 (115), receive ring 2 (120), receive ring 3 (125)) each packet is forwarded. In one embodiment of the invention, analyzing the packets by the classifier (110) includes analyzing one or more fields in each of the packets to determine to which of the receive rings (e.g., receive ring 1 (115), receive ring 2 (120), receive ring 3 (125)) the packets are forwarded. As an alternative, the classifier (110) may use the contents of one or more fields in each packet as an index into a data structure that includes information necessary to determine to which receive ring (e.g., receive ring 1 (115), receive ring 2 (120), receive ring 3 (125)) that packet is forwarded. The classifier (110) may also use other data found in the packet, such as the destination Media Access Control (MAC) address, to classify the packet.

In one or more embodiments of the invention, the classifier (110) places packets into receive rings (e.g., receive ring 1 (115), receive ring 2 (120), receive ring 3 (125)) based on the packet destination (e.g., packet destination 1 (170), packet destination 2 (175), packet destination 3 (180)). As a result, each packet is linked to a packet destination (e.g., packet destination 1 (170), packet destination 2 (175), packet destination 3 (180)) even before the packet enters the host (100). The classifier (110) may be implemented by a separate microprocessor embedded on the NIC (105). Alternatively, the classifier (110) may be implemented in software stored in memory (e.g., firmware, etc.) on the NIC (105) and executed by a microprocessor on the NIC (105).

In one or more embodiments of the invention, the host (100) may include a device driver (not shown) and one or more virtual NICs (e.g., virtual NIC 1 (135), virtual NIC 2 (140), virtual NIC 3 (145)). In one embodiment of the invention, the device driver provides an interface between the receive rings (e.g., receive ring 1 (115), receive ring 2 (120), receive ring 3 (125)) and the host (100). More specifically, the device driver (not shown) exposes the receive rings (e.g., receive ring 1 (115), receive ring 2 (120), receive ring 3 (125)) to the host (100). In one embodiment of the invention, each of the virtual NICs (e.g., virtual NIC 1 (135), virtual NIC 2 (140), virtual NIC 3 (145)) is associated with one or more receive rings (e.g., receive ring 1 (115), receive ring 2 (120), receive ring 3 (125)). In other words, a virtual NIC (e.g., virtual NIC 1 (135), virtual NIC 2 (140), virtual NIC 3 (145)) receives incoming packets from a corresponding receive ring (s) (e.g., receive ring 1 (115), receive ring 2 (120), receive ring 3 (125)). In one or more embodiments of the invention, outgoing packets are forwarded from a virtual NIC (e.g., virtual NIC 1 (135), virtual NIC 2 (140), virtual NIC 3 (145)) to a corresponding transmit ring (not shown), which temporarily stores the packet before transmitting the packet over the network. In one or more embodiments of the invention, receive rings (e.g., virtual NIC 1 (135), virtual NIC 2 (140), virtual NIC 3 (145)) and transmit rings (not shown) are implemented as ring buffers in the NIC (105).

In one or more embodiments of the invention, the virtual NICs (e.g., virtual NIC 1 (135), virtual NIC 2 (140), virtual NIC 3 (145)) are operatively connected to packet destinations (e.g., packet destination 1 (170), packet destination 2 (175), packet destination 3 (180)), which include containers and applications, via VNSs (e.g., VNS 1 (162), VNS 2 (164), VNS 3 (166)). The virtual NICs (e.g., virtual NIC 1 (135), virtual NIC 2 (140), virtual NIC 3 (145)) provide an abstraction layer between the NIC (105) and the packet destinations (e.g., packet destination 1 (170), packet destination 2 (175), packet destination 3 (180)) on the host (100). More specifically, each virtual NIC (e.g., virtual NIC 1 (135), virtual NIC 2 (140), virtual NIC 3 (145)) operates like a NIC (105). For example, in one embodiment of the invention, each virtual NIC (e.g., virtual NIC 1 (135), virtual NIC 2 (140), virtual NIC 3 (145)) is associated with one or more IP addresses, associated with one or more MAC addresses, associated with one or more ports, and configured to handle one or more protocol types. Thus, while the host (100) may be operatively connected to a single NIC (105), packet destinations (e.g., packet destination 1 (170), packet destinations 2 (175), packet destinations 3 (180)) executing on the host (100) operate as if the host (100) is bound to multiple NICs.

In one embodiment of the invention, each VNS (e.g., VNS 1 (162), VNS 2 (164), VNS 3 (166)) includes functionality to process packets in accordance with various protocols used to send and receive packets (e.g., Transmission Communication Protocol (TCP), Internet Protocol (IP), User Datagram Protocol (UDP), etc.). Further, each VNS (e.g., VNS 1 (162), VNS 2 (164), VNS 3 (166)) may also include functionality, as needed, to perform additional processing on the incoming and outgoing packets. This additional processing may include, but is not limited to, cryptographic processing, firewall routing, etc.

In one or more embodiments of the invention, the VNSs (e.g., VNS 1 (162), VNS 2 (164), VNS 3 (166)) correspond to network stacks with network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). In one or more embodiments of the invention, the VNSs (e.g., VNS 1 (162), VNS 2 (164), VNS 3 (166)) implement an IP layer (not shown) and a TCP layer (not shown).

In one embodiment of the invention, the virtual NIC (e.g., virtual NIC 1 (135), virtual NIC 2 (140), virtual NIC 3 (145)) may be bound to a virtual machine (e.g., Xen Domain) instead of a VNS (e.g., VNS 1 (162), VNS 2 (164), VNS 3 (166)). In such cases, the virtual NIC (e.g., virtual NIC 1 (135), virtual NIC 2 (140), virtual NIC 3 (145)) is bound to an interface (e.g., a Xen interface), where the interface enables the virtual NIC (e.g., virtual NIC 1 (135), virtual NIC 2 (140), virtual NIC 3 (145)) to communicate to with the virtual machine. In one embodiment of the invention, the aforementioned virtual machine includes its own VNS and includes its own operating system (OS) instance, which may be different than the OS executing on the host.

During initialization, the packet destination (or the virtual machine) is linked to a processor (i.e., a CPU) and associated with a VNS (e.g., VNS 1 (162), VNS 2 (164), VNS 3 (166)) (or interface). In one or more embodiments of the invention, assigning a packet destination to a VNS (e.g., VNS 1 (162), VNS 2 (164), VNS 3 (166)) involves assigning the packet destination an unique identifier (ID) or assigning a VNS (e.g., VNS 1 (162), VNS 2 (164), VNS 3 (166)) a unique ID, where the VNS (e.g., VNS 1 (162), VNS 2 (164), VNS 3 (166)) is associated with the packet destination. In the case of the virtual machine, the virtual machine or the interface associated with the virtual machine is assigned a unique ID. Alternatively, a virtual NIC (e.g., virtual NIC 1 (135), virtual NIC 2 (140), virtual NIC 3 (145)) associated with a VNS (or interface of a virtual machine) may be assigned a unique ID that may be used to identify the VNS (or the interface of the virtual machine.

The memory allocator (130) is responsible for allocating virtual memory to the packet destinations (e.g., packet destination 1 (170), packet destination 2 (175), packet destination 3 (180)) (or virtual machines). In one or more embodiments of the invention, virtual memory is allocated from a virtual memory pool (i.e., the total virtual memory which the host (100) or processes executing thereon may use).

In one embodiment of the invention, a packet destination (or virtual machine) uses the allocated virtual memory to send and receive packets. In one or more embodiments of the invention, the virtual memory allocated to a given packet destination (or virtual machine) is used to store incoming and outgoing packets in transit between a receive ring or transmit ring and the corresponding packet destination (or virtual machine).

If a packet destination (or virtual machine) attempts to use virtual memory in excess of the amount of virtual memory allocated to the packet destination (or virtual machine), the memory allocator (130) (or a process associated with the memory allocator) blocks the packet destination (or virtual machine) until the packet destination (or virtual machine) has sufficient free virtual memory to issue additional outgoing packets or obtain incoming packets from the corresponding receive ring. Because each receive ring is associated with a packet destination (or virtual machine), the memory allocator (130) is able to enforce the virtual memory usage by keeping packets in the receive rings until the packet destination (or virtual machine) has sufficient available virtual memory to process the packets. Similarly, a packet destination (or virtual machine) is unable to transmit packets to the NIC (105) unless the packet destination (or virtual machine) has sufficient available virtual memory to store the packets.

As discussed above, the packet destination (e.g., packet destination 1 (170), packet destination 2 (175), packet destination 3 (180)) (or virtual machine) or the associated VNS (e.g., VNS 1 (162), VNS 2 (164), VNS 3 (166)) (or interface) is assigned a unique ID. Using the aforementioned ID, virtual memory usage for each packet destination (or virtual machine) may be monitored and requests for virtual memory denied when the packet destination (or virtual machine) attempts to obtain virtual memory in excess of the virtual memory allocated to the packet destination (or virtual machine).

In one embodiment of the invention, if a packet destination (or virtual machine) attempts to obtain virtual memory in excess of the virtual memory allocated to the packet destination (or virtual machine), then the memory allocator may re-allocate the virtual memory based on the priority associated with the packet destination (or virtual machine) that is attempting to obtain virtual memory in excess of the allocated virtual memory. In such cases, a packet destination (or virtual machine) with a higher priority may be allocated additional virtual memory at the expense of a packet destination (or virtual machine) with a lower priority.

Figure 2:
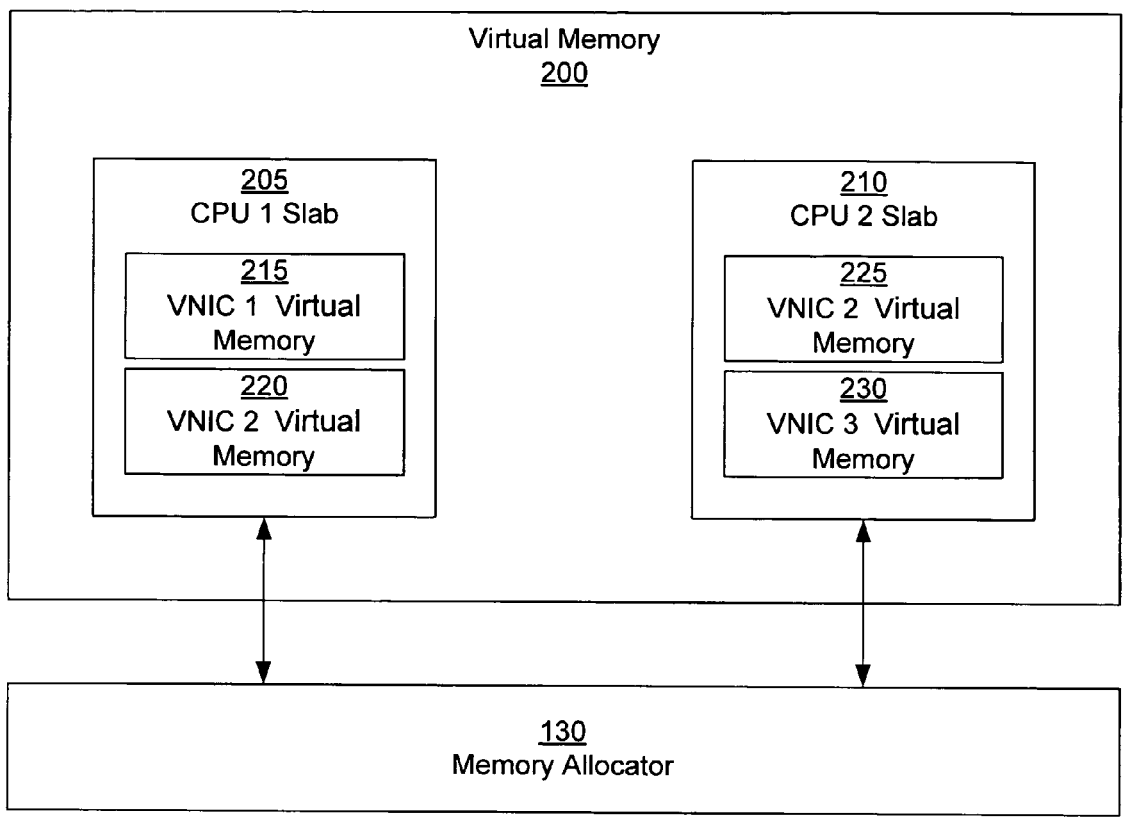

FIG. 2 shows a schematic diagram of a memory allocation system in accordance with one or more embodiments of the invention. The memory allocation system includes a memory allocator (130), virtual memory (200), multiple slabs associated with central processing units (CPUs) (e.g., CPU 1 slab (205), CPU 2 slab (210)), and allocated virtual memory for each virtual NIC (e.g., VNIC 1 memory (215), VNIC 2 memory (220), VNIC 2 memory (225), VNIC 3 memory (230)).

Virtual memory (200) in FIG. 2 denotes the virtual memory pool for the host (100 in FIG. 1). Further, the virtual memory (200), as shown in FIG. 2, is divided into smaller portions (i.e., CPU slabs (205, 210)), where each of the portions is associated with a CPU executing on the host (100 in FIG. 1).

In one or more embodiments of the invention, the virtual memory (200) may be located on multiple physical memory devices, CPU caches, main memory (e.g., dynamic Random Access Memory (RAM)), and disk storage. In addition, contiguous regions of virtual memory may actually be located on noncontiguous regions of physical memory on multiple physical memory devices. In one or more embodiments of the invention, pages of a power of 2 length (e.g., 1024 bytes-8192 bytes) are mapped to page frames, or contiguous regions of physical memory. In one or more embodiments of the invention, a memory management unit (MMU) (not shown) within the memory allocator (130) maps a contiguous region of virtual memory (200) to page frames scattered around physical memory.

In one or more embodiments of the invention, a CPU slab (e.g., CPU 1 slab (205), CPU 2 slab (210)) is made up of one or more page frames allocated from virtual memory (200). As discussed above, a CPU slab (e.g., CPU 1 slab (205), CPU 2 slab (210)) is allocated for a CPU. For example, if a system contains five CPUs, then memory allocator (130) allocates one CPU slab (e.g., CPU 1 slab (205), CPU 2 slab (210)) for each CPU from virtual memory (200) for a total of five CPU slabs.

In addition, each packet destination (or virtual machine) that uses a CPU is allocated virtual memory within that CPU slab (e.g., CPU 1 slab (205), CPU 2 slab (210)). In one or more embodiments of the invention, virtual memory within each CPU slab is allocated on a packet destination (or virtual machine) basis and, alternatively, as shown in FIG. 2, on a virtual NIC basis.

As discussed above, each packet destination (or virtual machine) may be associated with an ID or alternatively, each virtual NIC may be associated with an ID. Those skilled in the art will appreciate that allocating virtual memory based on either virtual NICs or packet destination (or virtual machines) will produce the same result since packet destinations (or virtual machines) are mapped one-to-one to virtual NICs.

Continuing with the discussion of FIG. 2, each CPU slab (e.g., CPU 1 slab (205), CPU 2 slab (210)) may include virtual memory for each virtual NIC. In one or more embodiments of the invention, a virtual NIC is allocated virtual memory (e.g., VNIC virtual memory (215, 220, 225, 230)) in a CPU slab (e.g., CPU 1 slab (205), CPU 2 slab (210)) for each CPU the virtual NIC (or packet destination or virtual machine) uses.

As shown in FIG. 2, virtual NIC 1 is allocated virtual memory (215) in the CPU 1 slab (205) and virtual NIC 3 is allocated virtual memory (230) in the CPU 2 slab, indicating that virtual NIC 1 uses CPU 1 and virtual NIC 3 uses CPU 2. However, virtual NIC 2 is allocated virtual memory (e.g., VNIC 2 virtual memory (220), VNIC 2 virtual memory (225)) in both the CPU 1 slab (205) and the CPU 2 slab (210), which indicates that virtual NIC 2 uses both CPU 1 and CPU 2. In one or more embodiments of the invention, the virtual memory is allocated from one or more pages in virtual memory (200). Further, the virtual memory allocated for each virtual NIC may include one or more pages in virtual memory (200), or a page may be shared by multiple virtual NICs, depending on the page size. For example, a virtual NIC that is given 1024 bytes of memory may be allocated one page of 1024 bytes or share a larger page (e.g., 2048 bytes or 4096 bytes) with other virtual NICs.

In one or more embodiments of the invention, the virtual memory allocated for each virtual NIC is allocated based on priority. For example, if virtual NIC 1 has a higher priority than virtual NIC 2, then the memory allocator (130) will allocate more virtual memory to VNIC 1 than to VNIC 2. In addition, if virtual NIC 1 experiences a memory shortage, the memory allocator (130) may reallocate virtual memory from VNIC 2 to VNIC 1.

Figure 3:
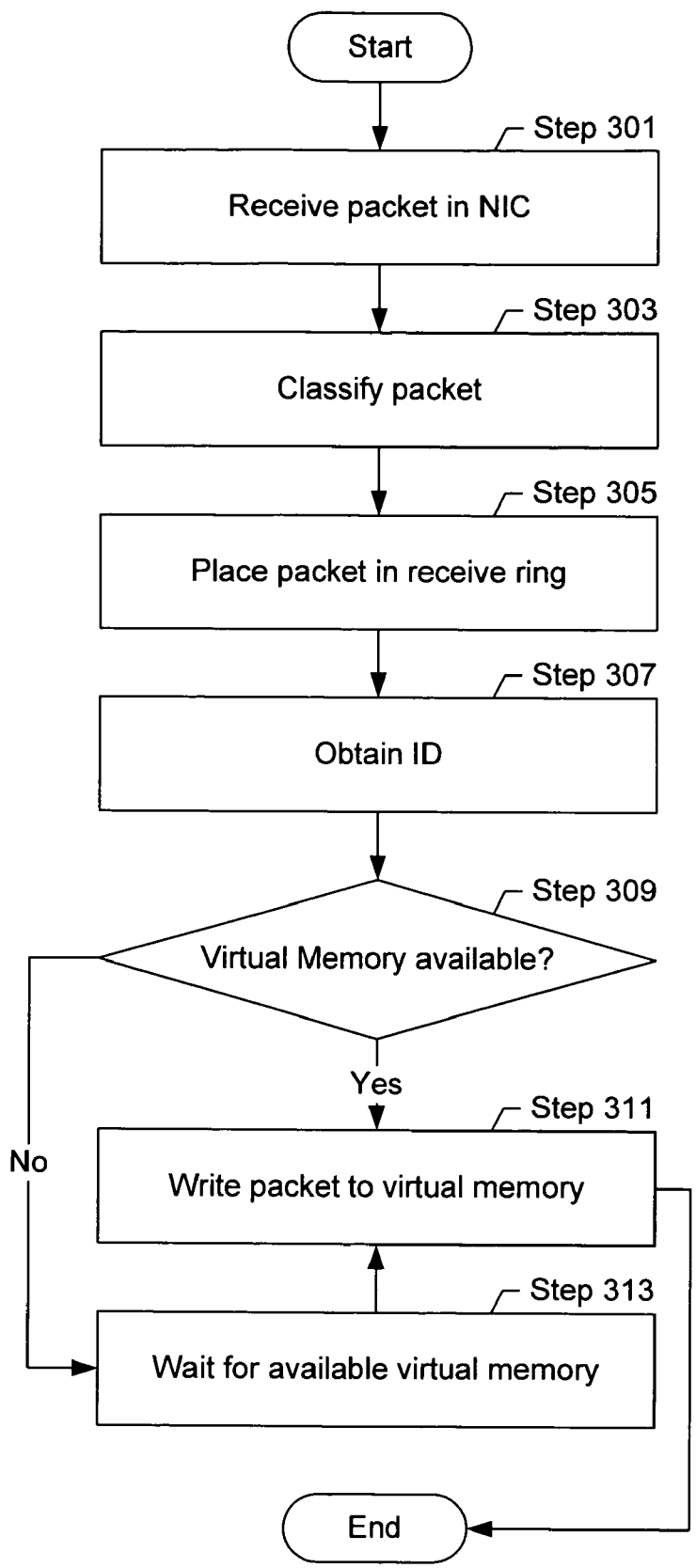
FIGS. 3-4 show flow diagrams in accordance with one or more embodiments of the invention.

FIG. 3 shows a flow diagram in accordance with one or more embodiments of the invention. More specifically, FIG. 3 shows a method for enforcing virtual memory usage by a packet destination (or virtual machine) in accordance with one embodiment of the invention.

Initially, a packet is received by a NIC (Step 301). The packet is classified (Step 303) by the classifier and placed into the appropriate receive ring (Step 305). In one or more embodiments of the invention, the classifier is configured to differentiate packets by packet destination (or virtual machine) and place each packet into a receive ring corresponding to the packet destination (or virtual machine).

At this stage, the ID associated with the packet destination (or virtual machine) is obtained (Step 307). In one embodiment of the invention, the ID is directly associated with the packet destination (or virtual machine). Alternatively, the ID may be associated with a virtual NIC or VNS associated with the packet destination. In addition, the ID may be associated with a virtual NIC or an interface associated with the virtual machine. Because each receive ring is associated with a virtual machine or packet destination, the aforementioned ID may be obtained based on the receive ring to which the packet is forwarded. Alternatively, the ID may be associated with the receive ring, such that when a packet is received by the receive ring, the ID is associated with the packet.

Using the ID, a determination is made about whether virtual memory associated with the packet destination (or virtual machine) is available (Step 309). In one embodiment of the invention, the determination includes sending a request for virtual memory to the memory allocator (or a process related to the memory allocator) where the request includes the amount of virtual memory required and the ID.

Upon receiving the request, the memory allocator (or a process related to the memory allocator) uses the ID to determine the amount of available virtual memory for the packet destination (or virtual machine) associated with the ID. In one embodiment of the invention, the memory allocator (or a process related to the memory allocator) includes information about the total amount of virtual memory allocated to a given packet destination (or virtual machine) indexed by ID as well as the amount of the aforementioned allocated virtual memory currently being used by the given packet destination (or virtual machine).

Using this information, the memory allocator (or a process related to the memory allocator) determines whether there is sufficient virtual memory available to service the request. Said another way, the memory allocator (or a process related to the memory allocator) determines whether the sum of the virtual memory currently being used by the packet destination (or virtual machine) plus the requested virtual memory will exceed the total amount of virtual memory allocated to the packet destination (or virtual machine).

If virtual memory is available (i.e., the sum of the virtual memory currently being used by the packet destination (or virtual machine) plus the requested virtual memory does not exceed the total amount of virtual memory allocated to the packet destination (or virtual machine)), then the packet is written to virtual memory (Step 311) and enters the system. Writing to virtual memory includes allocating virtual memory, writing the packet to the virtual memory, and updating the memory allocator (or a process related to the memory allocator) to reflect that packet destination (or virtual machine) has allocated the additional virtual memory.

Alternatively, if virtual memory is not available, the packet stays in the receive ring until sufficient virtual memory is available (Step 313) before being written to network memory (Step 311).

Outgoing packets from the packet destination or virtual machine are handled similarly (i.e., using a similar process to the one described in FIG. 3). Specifically, each packet is stored in the packet destination (or virtual machine)until sufficient virtual memory is available; the packet is then written to virtual memory and passed through the VNS (or interface) to the associated virtual NIC. The virtual NIC, upon receipt of the packet, sends the packet to a transmit ring on the NIC, where the packet is transmitted over the network.

Figure 4:
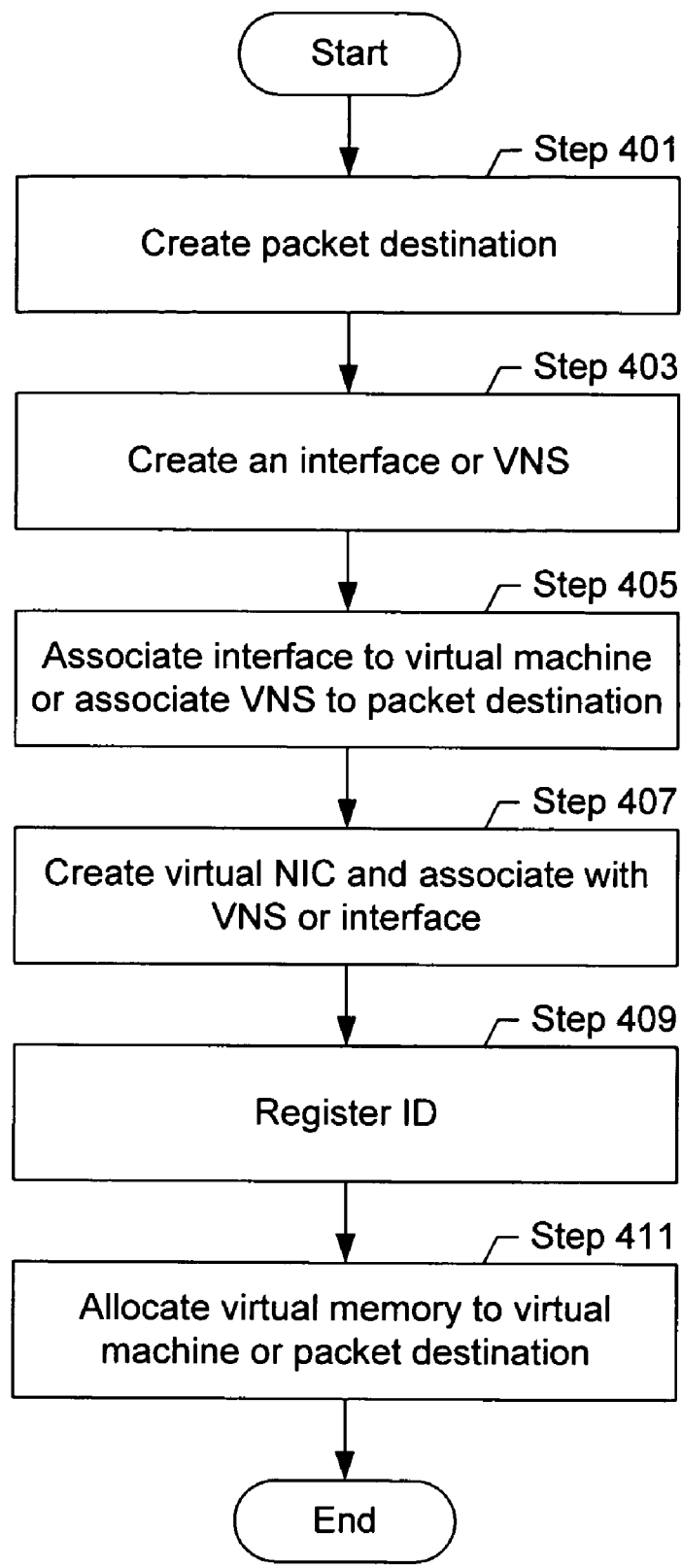

FIG. 4 shows a flow diagram in accordance with one or more embodiments of the invention. More specifically, FIG. 4 shows a method for setting up the system in accordance with one embodiment of the invention.

Initially, a packet destination (or virtual machine) is created (Step 401). Next, a VNS (or an interface) is created (Step 403). The VNS (or interface) is associated to the packet destination (or virtual machine) (Step 405).

A virtual NIC is subsequently created and associated with the VNS (or interface) (Step 407). The ID associated with one of the packet destination (or virtual machine), the VNS (or interface), or virtual NIC is then sent to the memory allocator, where the ID is registered (Step 409). The aforementioned ID is set during the creation of the component (i.e., the packet destination (or virtual machine), the VNS (or interface), or the virtual NIC) that includes the ID.

Returning to the discussion of FIG. 4, virtual memory is then allocated to the packet destination (or virtual machine) (Step 411). Because the ID is registered with the memory allocator, the ID may be subsequently used (as discussed in FIG. 3) to allocate virtual memory for incoming and outgoing packets and to enforce virtual memory usage by packet destinations (or virtual machines). Thought not shown in FIG. 4, the ID may be associated with a receive ring associated with the packet destination (or virtual machine), such that each time a packet is placed in the receive ring, the packet is associated with the ID.

Figure 5:
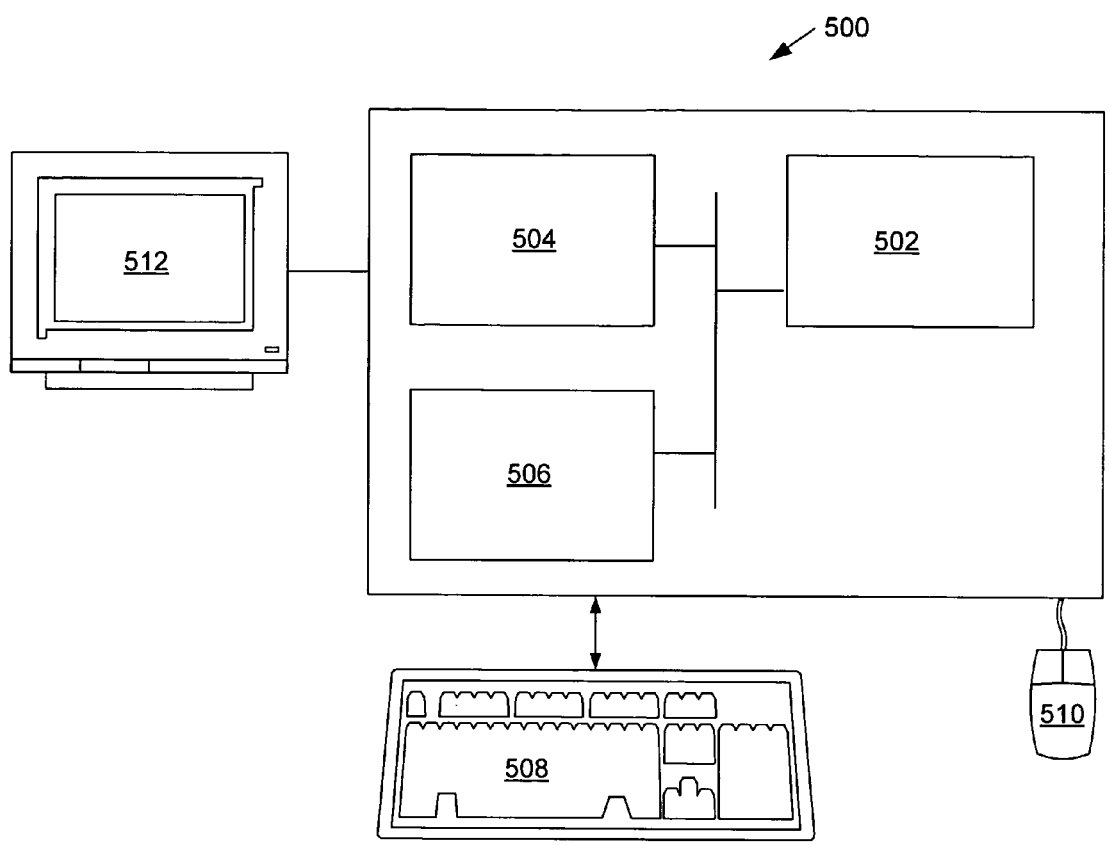
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., packet destination or virtual machine, CPU, or virtual memory) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a packet, comprising:
   receiving from a network, at a network interface card (NIC), the packet for a first target, wherein the first target is one of a plurality of targets located on a host, and wherein the NIC is interposed between the host and the network;
   classifying the packet;
   sending the packet to a receive ring based on the classification, wherein the receive ring is one of a plurality of receive rings located on the NIC, and wherein each of the plurality of receive rings is associated with a different one of the plurality of targets;
   obtaining an identifier (ID) based on the classification, wherein the ID is associated with the first target, wherein the ID is associated with a first virtual memory allocation, wherein the first virtual memory allocation is allocated to the first target, wherein a second virtual memory allocation is allocated to a second target, wherein the first virtual memory allocation and the second virtual memory allocation are allocated from a virtual memory pool included in the host, and wherein the first virtual memory allocation and the second virtual memory allocation are allocated prior to receiving the packet;
   sending a request, based on classifying the packet, to allocate virtual memory on the host to the first target, wherein the request comprises the ID and a requested amount of virtual memory required to store the packet;
   determining, using the ID, whether allocating the requested amount of virtual memory would cause the first target to exceed the first virtual memory allocation;
   upon determining that allocating the requested amount of virtual memory would not cause the first target to exceed the first virtual memory allocation, then perform:
      allocating the virtual memory;
      storing the packet in the virtual memory on the host; and
   upon determining that allocating the requested amount of virtual memory would cause the first target to exceed the first virtual memory allocation, then perform:
      storing the packet in the receive ring until allocating the requested amount of virtual memory would not cause the first target to exceed the first virtual memory allocation.

2. The method of claim 1, wherein the ID is stored in the receive ring.

3. The method of claim 1, wherein the first target is one selected from a group consisting of a packet destination and a virtual machine.

4. The method of claim 1, wherein information about the first virtual memory allocation is stored in a memory allocator on the host.

5. The method of claim 1, wherein the first virtual memory allocation is set when the first target is created.

6. The method of claim 1, wherein the first virtual memory allocation is decreased if the second target requires additional virtual memory and the second target is associated with a higher priority than the first target.

7. The method of claim 1, wherein the first virtual memory allocation comprises a portion of a virtual memory slab associated with a first processor and a portion of a virtual memory slab associated with a second processor.

8. The method of claim 1, wherein the packet is sent to one selected from a group consisting of a virtual network stack and an interface after the packet has been stored in virtual memory on the host.

9. A system, comprising:
   a network interface card (NIC) configured to:
      receive a packet from a network for a first target, wherein the first target is one of a plurality of targets located on a host, and wherein the NIC is interposed between the host and the network;
      classify the packet;
      send the packet to a receive ring based on the classification, wherein the receive ring is one of a plurality of receive rings located on the NIC, and wherein each of the plurality of receive rings is associated with a different one of the plurality of targets;
      obtain an ID based on the classification, wherein the ID is associated with the first target, wherein the ID is associated with a first virtual memory allocation, wherein the first virtual memory allocation is allocated to the first target, wherein a second virtual memory allocation is allocated to a second target, wherein the first virtual memory allocation and the second virtual memory allocation are allocated from a virtual memory pool included in the host, and wherein the first virtual memory allocation and the second virtual memory allocation are allocated prior to receiving the packet; and
      send a request, based on classifying the packet, to allocate virtual memory on the host to the first target, wherein the request comprises the ID and a requested amount of virtual memory required to store the packet; and
   the host, operatively connected to the NIC, configured to:
      determine, using the ID, whether allocating the requested amount of virtual memory would cause the first target to exceed the first virtual memory allocation;
      upon determining that allocating the requested amount of virtual memory would not cause the first target to exceed the first virtual memory allocation, then perform:
         allocate the virtual memory;
         obtain the packet from the receive ring;
         store the packet in the virtual memory on the host; and
      upon determining that allocating the requested amount of virtual memory would cause the first target to exceed the first virtual memory allocation, then perform:
         store the packet in the receive ring until allocating the requested amount of virtual memory would not cause the first target to exceed the first virtual memory allocation.

10. The system of claim 9, wherein the ID is stored in the receive ring.

11. The system of claim 9, wherein the first target is one selected from a group consisting of a packet destination and a virtual machine.

12. The system of claim 9, wherein information about the first virtual memory allocation is stored in a memory allocator on the host.

13. The system method of claim 9, wherein the first virtual memory allocation is set when the first target is created.

14. The system method of claim 9, wherein the first virtual memory allocation is decreased if the second target requires additional virtual memory and the second target is associated with a higher priority than the first target.

15. The system method of claim 9, wherein the first virtual memory allocation comprises a portion of a virtual memory slab associated with a first processor and a portion of a virtual memory slab associated with a second processor.

16. The system method of claim 9, wherein the packet is sent to one selected from a group consisting of a virtual network stack and an interface after the packet has been stored in virtual memory on the host.

17. A non-transitory computer readable medium comprising instructions for a method for processing a packet, the method comprising:
   receiving from a network, at a network interface card (NIC), the packet for a first target, wherein the first target is one of a plurality of targets located on a host, and wherein the NIC is interposed between the host and the network;
   classifying the packet;
   sending the packet to a receive ring based on the classification, wherein the receive ring is one of a plurality of receive rings located on the NIC, and wherein each of the plurality of receive rings is associated with a different one of the plurality of targets;
   obtaining an ID based on the classification, wherein the ID is associated with the first target, wherein the ID is associated with a first virtual memory allocation, wherein the first virtual memory allocation is allocated to the first target, wherein a second virtual memory allocation is allocated to a second target, wherein the first virtual memory allocation and the second virtual memory allocation are allocated from a virtual memory pool included in the host, and wherein the first virtual memory allocation and the second virtual memory allocation are allocated prior to receiving the packet;
   sending a request, based on classifying the packet, to allocate virtual memory on the host to the first target, wherein the request comprises the ID and a requested amount of virtual memory required to store the packet;
   determining, using the ID, whether allocating the requested amount of virtual memory would cause the first target to exceed the first virtual memory allocation;
   upon determining that allocating the requested amount of virtual memory would not cause the first target to exceed the first virtual memory allocation, then perform:
      allocating the virtual memory;
      storing the packet in the virtual memory on the host; and
   upon determining that allocating the requested amount of virtual memory would cause the first target to exceed the first virtual memory allocation, then perform:
      storing the packet in the receive ring until allocating the requested amount of virtual memory would not cause the first target to exceed the first virtual memory allocation.

18. The non-transitory computer readable medium of claim 17, wherein the ID is stored in the receive ring.

19. The non-transitory computer readable medium of claim 17, wherein the first target is one selected from a group consisting of a packet destination and a virtual machine.

20. The non-transitory computer readable medium of claim 17, wherein the first virtual memory allocation is decreased if the second target requires additional virtual memory and the second target is associated with a higher priority than the first target.

* * * * *